US006993215B2

(12) United States Patent
Bruel

(10) Patent No.: US 6,993,215 B2
(45) Date of Patent: Jan. 31, 2006

(54) OPTICAL SWITCH WITH FLEXIBLE INSULATED BEAM AND METHOD FOR MAKING SAME

(75) Inventor: Michel Bruel, Veurey (FR)

(73) Assignee: Opsitech-Optical System on a Chip, Grenoble Cedex (FR)

( * ) Notice: Subject to any disclaimer, the term of this patent is extended or adjusted under 35 U.S.C. 154(b) by 73 days.

(21) Appl. No.: 10/466,179

(22) PCT Filed: Jan. 10, 2002

(86) PCT No.: PCT/FR02/00070

§ 371 (c)(1),
(2), (4) Date: Jan. 6, 2004

(87) PCT Pub. No.: WO02/056087

PCT Pub. Date: Jul. 18, 2002

(65) Prior Publication Data

US 2004/0101231 A1     May 27, 2004

(30) Foreign Application Priority Data

Jan. 15, 2001   (FR) .................................. 01 00476

(51) Int. Cl.
*G02B 6/26* (2006.01)

(52) U.S. Cl. ............................. 385/16; 385/14; 385/15; 385/52; 438/31

(58) Field of Classification Search .................. 385/14, 385/16, 17, 20, 22, 25, 52; 359/320, 618; 65/385, 386; 438/31

See application file for complete search history.

(56) References Cited

U.S. PATENT DOCUMENTS

| 5,239,601 A | * | 8/1993 | Denis et al. ................... 385/49 |
| 5,559,912 A | | 9/1996 | Agahi et al. ................... 385/42 |
| 5,612,815 A | | 3/1997 | Labeye et al. .............. 359/320 |
| 5,926,591 A | * | 7/1999 | Labeye et al. ................. 385/25 |
| 2004/0013346 A1 | * | 1/2004 | Ruan et al. ................... 385/17 |

FOREIGN PATENT DOCUMENTS

GB     2 320 104     6/1998   .................. 385/16

OTHER PUBLICATIONS

T T H Eng et al.: "Voltage-Controlled Micromechanical SOI Optical Waveguides" 1995 IEEE Tencon. IEEE Region Ten International Conference On Microelectronics and VLSI. (TENCON), New York, IEEE, US, Nov. 6, 1995, pp. 195-197, XP000585775, ISBN: 0-7803-2625-3.

(Continued)

*Primary Examiner*—Brian Healy
*Assistant Examiner*—Christopher M. Kalivoda
(74) *Attorney, Agent, or Firm*—Young & Thompson

(57) ABSTRACT

A method for making an optical structure and a multilayer optical structure provided with optical guide elements for transmitting at least a light wave, comprises: providing a substrate with a first and second layer; etching out in the second electrically conducting layer a groove having two opposite ends and partly enclosing a first zone of the layer; filling the groove with electrically insulating material; etching out a cavity in the second layer then in the first non-electrically conducting layer partly enclosing a second zone of the second layer, adjacent to or extending the first zone wherein emerges the groove; the cavity comprises a clearance in the second layer; such that the closed part of the second layer corresponding to the zones is electrically isolated from the rest of the layer and the cleared part beneath the second zone constitutes a beam.

20 Claims, 9 Drawing Sheets

OTHER PUBLICATIONS

T T H Eng et al." Surface-micromachined epitaxial silicon cantilevers as movable optical waveguides on silicon-on-insulator substrates", Sensors and Actuators A, Elsevier Sequoia S.A., Lausanne, CH, vol. 49, No. 1-2, Jun. 1995, pp. 109-113, XP004303630, ISSN: 0924-4247.

* cited by examiner

OPTICAL SWITCH WITH FLEXIBLE INSULATED BEAM AND METHOD FOR MAKING SAME

BACKGROUND OF THE INVENTION

The present invention relates to the field of optical wave transmission in optical guiding structures.

DESCRIPTION OF THE RELATED ART

To transport an optical wave, optical guides are used that generally consist of optical fibers or microfibers and/or of integrated components that include optical microguides. In general, optical fibers comprise an optical wave transmission core surrounded by a tubular cladding, the refractive index of the constituent material or materials of the core being higher than the refractive index of the constituent material of the cladding. In general, components with integrated microguides comprise an optical wave transmission core formed between two layers, the refractive index of the constituent material of the core being higher than the refractive index of the constituent material or materials of these layers.

Various optical guiding structures have in particular been disclosed in the patents FR-A-90/03902 and FR-A-95/00201.

Patent FR-A-90/03902 discloses integrated optical switches in which a flexible beam carrying longitudinally an optical microguide is capable of being deformed with respect to a fixed body so as to selectively bring the end of the core of the microguide of the beam into coincidence with the end of the fixed microguides.

Patent FR-A-95/00201 discloses integrated optical switches which comprise a movable platform placed between two parts of a body and connected to the latter by arms. The platform carries integrated optical microguides that are placed so as to switch, when the platform is moved transversely, a light wave arriving via an optical microguide from one part of the body selectively to two optical microguides of its other part.

The above documents also propose members for actuating the flexible beam and the movable platform. The beam and the platform are both made of an electrically insulating material and have arms covered with a metal layer, and the bodies have parts covered with a metal layer. These layers are placed a certain distance apart so as to constitute the electrodes for a capacitive or inductive effect and are connected to supply lines, for example via tracks and/or wire bridges.

SUMMARY OF THE INVENTION

The object of the present invention is in particular to improve and simplify the construction of actuating members in optical structures having movable or deformable parts, in particular those for optical switching.

The subject of the invention is firstly a process for producing an optical structure provided with at least one optical guiding means for the purpose of transmitting at least one optical or light wave.

According to the invention, this process consists in providing a substrate with an electrically nonconducting first layer and with an electrically conducting second layer; in producing a wall of electrical insulation in the second layer at least up to the first layer, having two opposed ends and partly surrounding a first region of this layer; and in excavating a cavity in the second layer and then in said first layer, partly surrounding a second region of the second layer, adjacent or extending said first region and into which said wall emerges, this cavity including a recess in the second layer beneath at least part of the second region; in such a way that the closed part of the second layer corresponding to said regions is electrically isolated from the rest of this layer and in such a way that the exposed part underneath said second region constitutes a beam.

According to a preferred variant of the invention, the process consists in providing a substrate with an electrically nonconducting first layer and with an electrically conducting second layer; in excavating a groove in the second layer at least down to the first layer, having two opposed ends and partly surrounding a first region of this layer; in at least partly filling the groove with an electrically insulating material; and in excavating a cavity in the second layer and then in said first layer, partly surrounding a second region of the second layer, adjacent or extending said first region and into which said groove emerges, said cavity including a recess in the second layer beneath at least part of the second region; in such a way that the closed part of the second layer corresponding to said regions is electrically isolated from the rest of this layer and in such a way that the exposed part beneath said second region constitutes a beam.

According to the invention, the process preferably consists in producing a recess such that said beam is cantilevered.

According to the invention, the process preferably consists in producing at least one optical guiding means that passes over said filled groove and between said ends of this filled groove.

According to the invention, the process preferably consists, between the operation of filling said groove and the operation of producing said cavity, in producing at least one optical microguide on the second layer, which passes over said filled groove and passes between said ends of this groove.

According to the invention, the process preferably consists, between the operation of filling said groove and the operation of producing said cavity, in producing at least one surface groove in said second layer, which passes over said filled groove and passes between said ends of this groove and, after the operation of producing said cavity and said recess, in fastening an optical microfiber to this groove.

According to the invention, the process preferably consists in producing at least one surface groove which passes over the cavity to be produced.

According to the invention, the process preferably consists in producing a groove that has end parts close together.

According to the invention, this process preferably consists in producing a groove that defines a T-shaped first region having a central branch directed toward said second region and two opposed side branches.

According to the invention, the process preferably consists in producing an electrical connection pad in said first region.

According to another variant of the invention, the process consists in producing said wall of insulation by locally doping said second layer.

The subject of the present invention is also an optical structure provided with at least one optical guiding means for the purpose of transmitting at least one optical or light wave.

According to the invention, this structure comprises in succession, on a substrate, an electrically nonconducting first layer, an electrically conducting second layer, and optical guiding means.

According to a variant of the invention, the second layer comprises a closed part, the periphery of which is bounded by a groove and a cavity which are excavated at least up to the first layer so as to electrically isolate this part from the rest of this layer, said groove being at least partly filled with an electrically insulating material and said cavity extending into said first layer, leaving a recess beneath said second layer so that the second layer constitutes a beam above this recess.

According to the invention, the structure preferably includes at least one optical guiding means extending along said second layer and passing over said filled groove and between the ends of this groove.

According to another variant of the invention, the second layer includes a closed part, the periphery of which is bounded by a wall of electrical insulation and a cavity which are excavated at least as far as the first layer so as to electrically isolate this part from the rest of this layer, said cavity extending into said first layer leaving a recess under said second layer so that the second layer constitutes a beam above this recess.

The structure includes at least one optical guiding means extending along said second layer and passing above said wall of insulation between the ends of said wall of insulation.

According to the invention, said groove preferably defines a T-shaped or C-shaped first region having a central branch directed toward said second region and two opposed side branches.

According to the invention, said recess preferably extends so as to constitute a cantilevered beam.

According to the invention, said optical guiding means preferably includes an integrated optical microguide.

According to the invention, said optical guiding means preferably includes a surface groove made in said second layer and at least one optical microfiber installed along this groove.

According to the invention, said optical guiding means preferably extends as far as the edge of said cavity.

According to the invention, the structure preferably includes an electrical connection pad formed in said first region.

According to the invention, the structure preferably includes an actuating member, said beam comprising at least part of this actuating member.

BRIEF DESCRIPTION OF THE DRAWINGS

The present invention will be more clearly understood on examining the optical structures and their manufacturing processes, these being described by way of nonlimiting examples and illustrated by the drawing in which.

DESCRIPTION OF THE PREFERRED EMBODIMENTS

Figure 8:
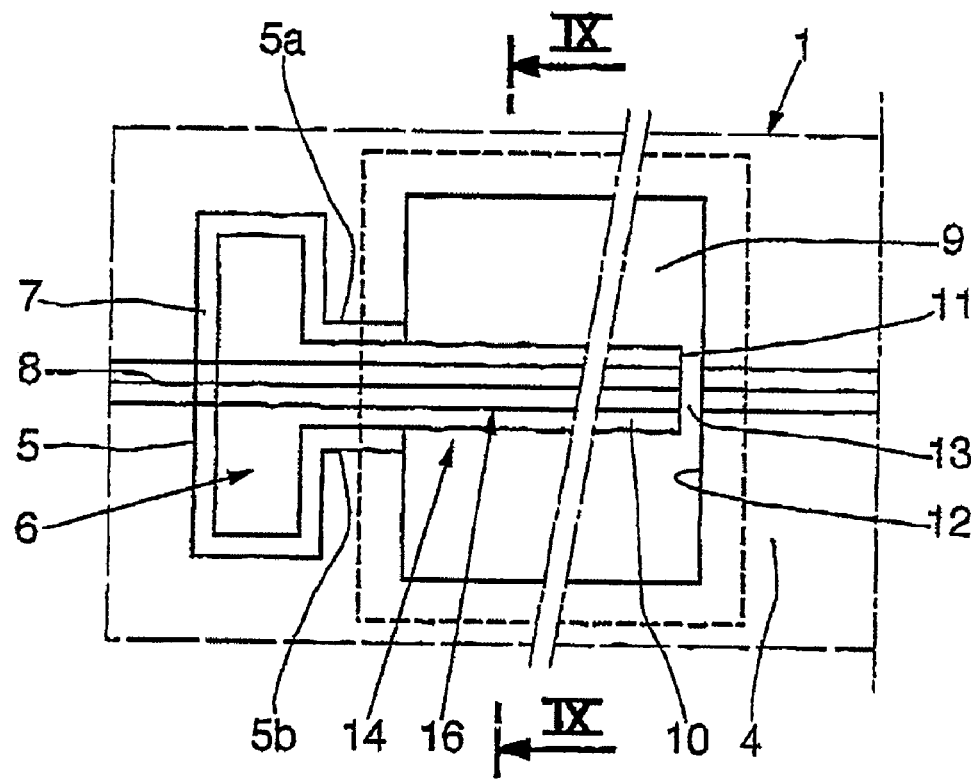
FIG. 8 shows a top view of the base structure after a fourth fabrication operation.
Figure 9:
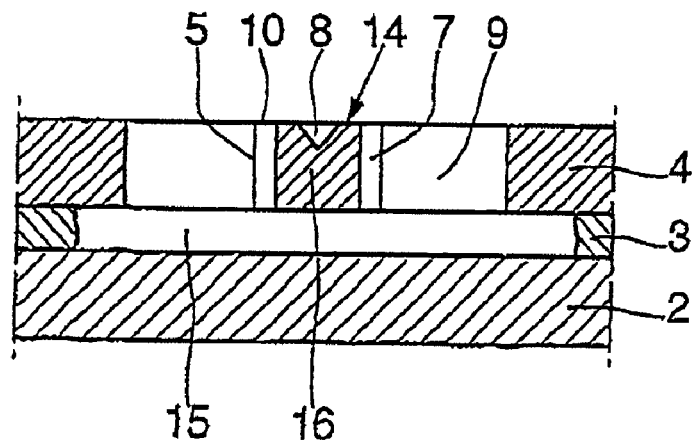
FIG. 9 shows a section on IX—IX of the structure in FIG. 8.
Figure 10:
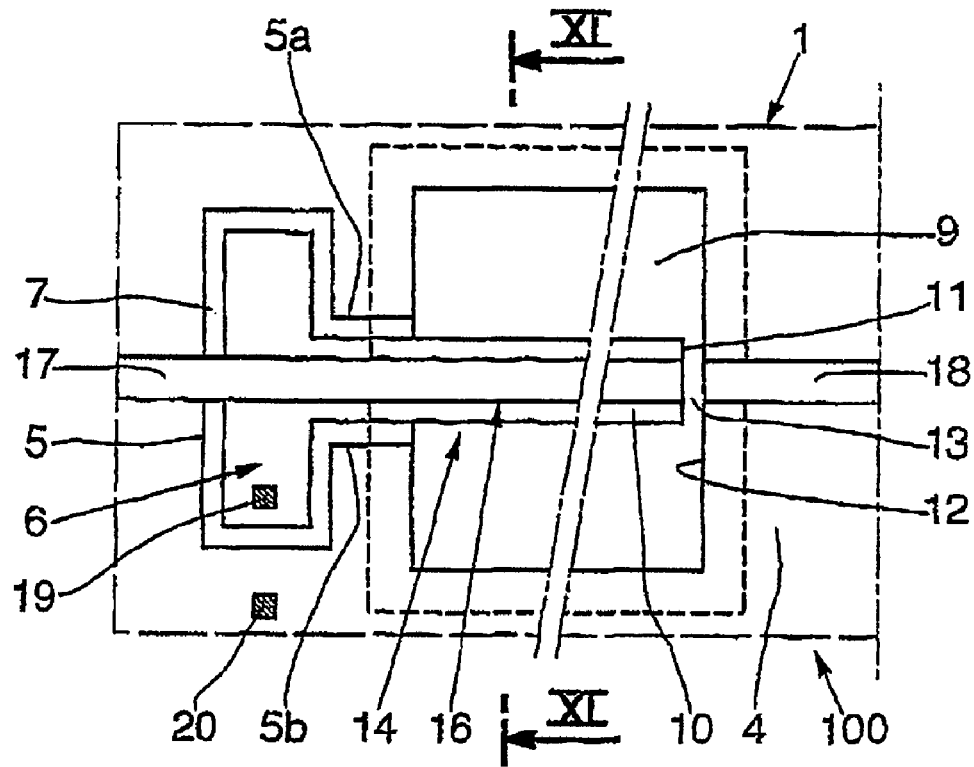
FIG. 10 shows a top view of the base structure after a fifth fabrication step, which constitutes a first final optical structure according to the present invention.
Figure 11:
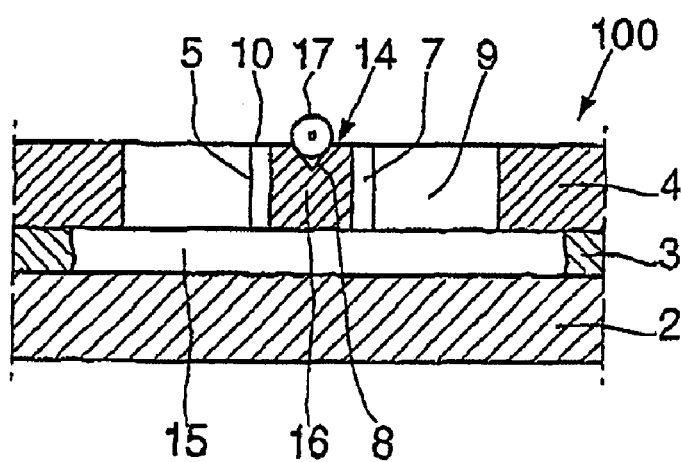
FIG. 11 shows a cross section on XI—XI of the final optical structure in FIG. 10.

A description will firstly be given, with reference to FIGS. 1 to 11, of the various operations leading to an optical structure 100 shown in its final form in FIGS. 10 and 11.

Figure 1:
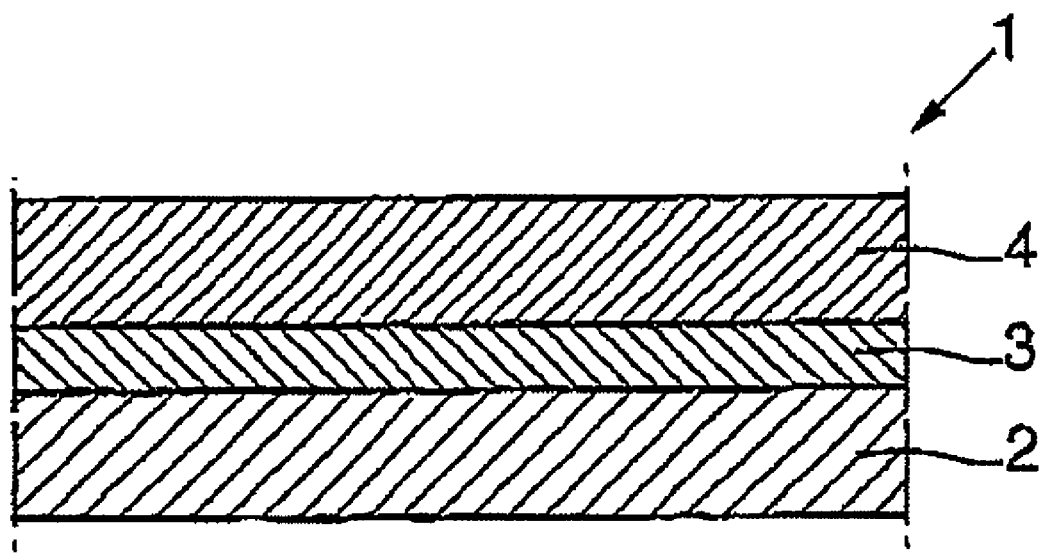
FIG. 1 shows a section through a first base structure according to the present invention.

FIG. 1 shows, on the one hand, a multilayer base structure 1 comprising a substrate 2, made of silicon for example, which is covered with a first layer 3 made of an insulating material such as silicon dioxide ($SiO_2$), which is itself covered with a second layer 4 made of an electrically conducting material, for example silicon.

Figure 2:
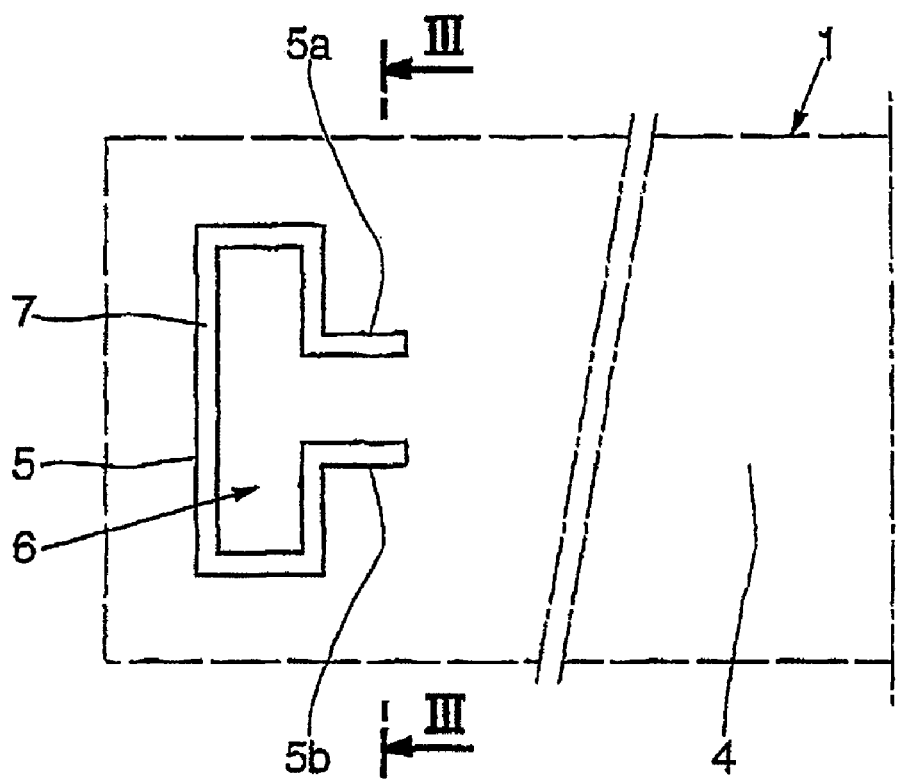
FIG. 2 shows a top view of the base structure in FIG. 1 after a first fabrication operation has been carried out.
Figure 3:
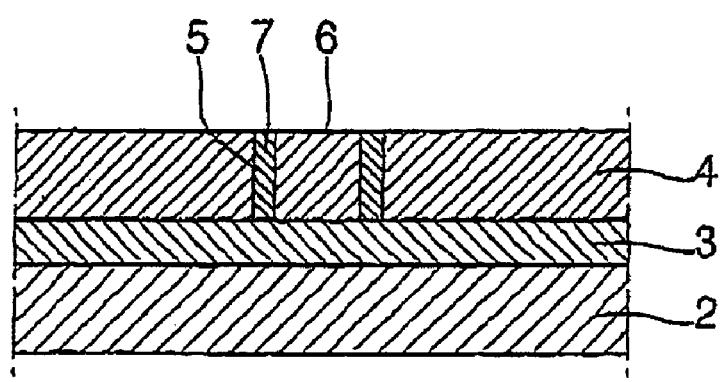
FIG. 3 shows a cross section on III—III of the structure in FIG. 2.

As shown in FIGS. 2 and 3, the conducting, layer 4 is excavated so as to produce a groove 5 extending depthwise as far as the conducting layer 3. This groove 5 defines and partly surrounds a first region 6 of the conducting layer 4.

In the example shown, the groove 5 is, seen from above, in the form of a C whose ends are extended by two parallel longitudinal end parts 5a and 5b that are close together, in such a way that the region 6 is, seen from above, in the form of a T with thick branches, its two opposed side branches being bounded by the C and its central branch being bounded by the two longitudinal end parts 5a and 5b.

Next, the groove 5 is filled with an electrically insulating material 7, for example with silica or silicon dioxide. A wall of electrical insulation formed by the groove 5 filled with material 7 is thus obtained.

Figure 4:
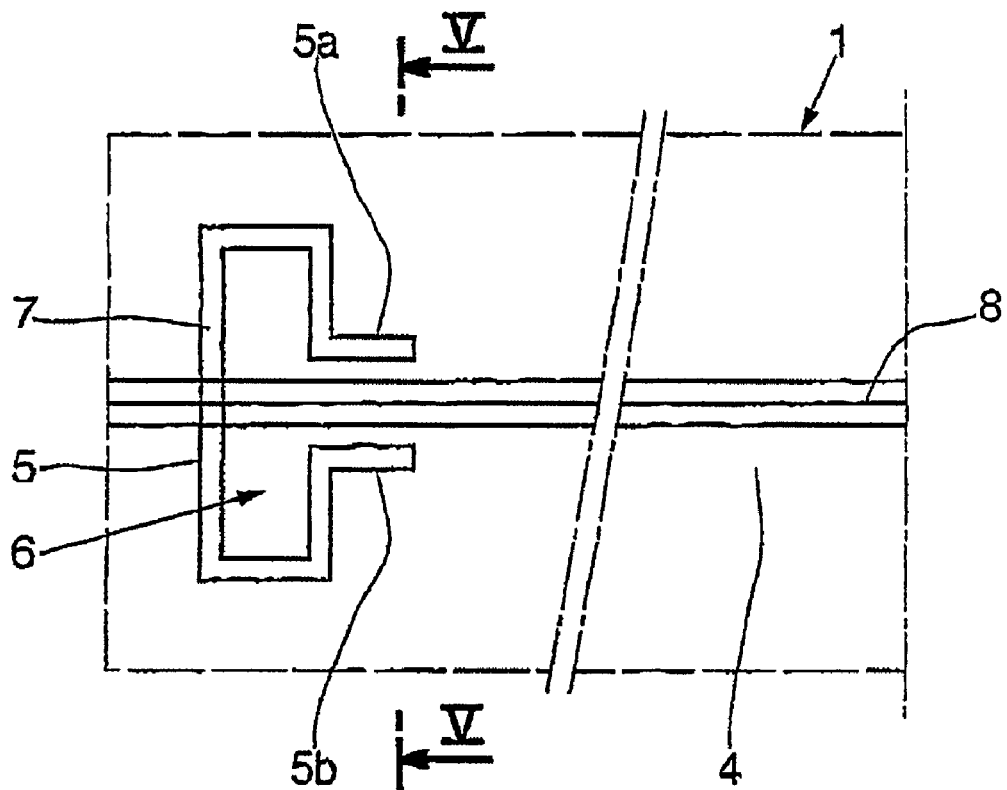
FIG. 4 shows a top view of the base structure after a second fabrication operation.
Figure 5:
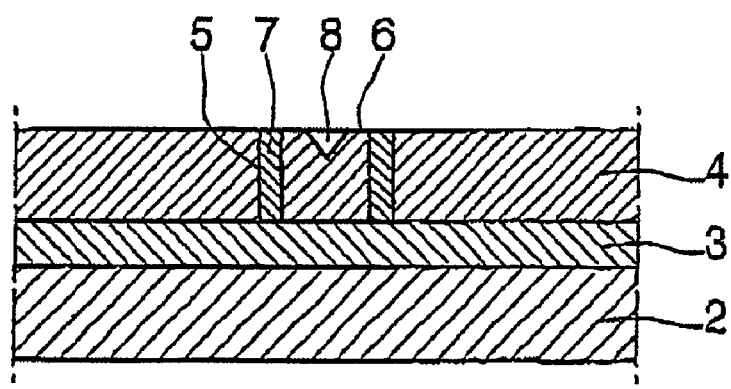
FIG. 5 shows a cross section on IV—IV of the structure in FIG. 4.

Next, as may be seen in FIGS. 4 and 5, a longitudinal groove 8, for example of V-shape cross-section is excavated in the surface of the conducting layer 4, which groove crosses over the filled groove 5 and passes axially through the region 6, passing between its longitudinal end parts 5a and 5b.

Figure 6:
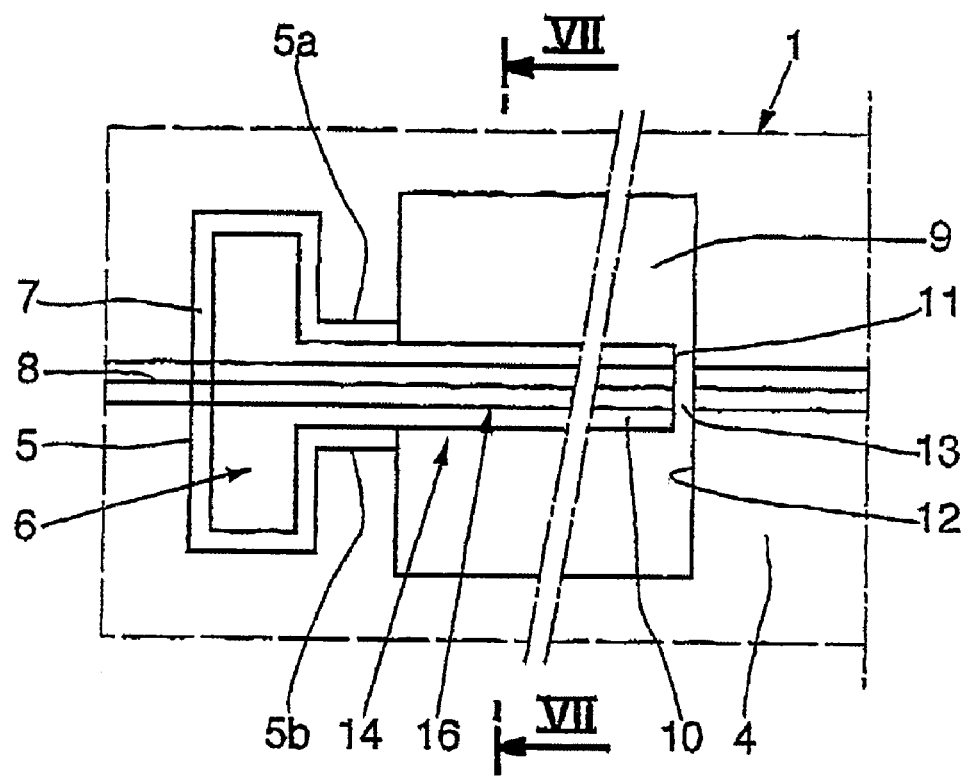
FIG. 6 shows a top view of the base structure after a third fabrication operation.
Figure 7:
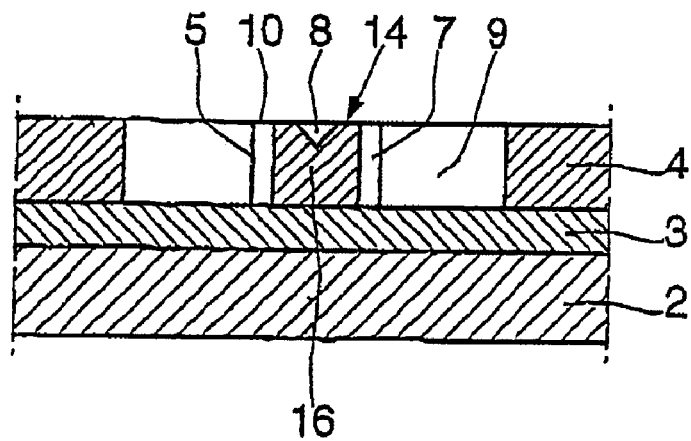
FIG. 7 shows a cross section on VII—VII of the structure in FIG. 6.

Next, as may be seen in FIGS. 6 and 7, a cavity 9 is excavated in the conducting layer 4 as far as the insulating layer 3, which cavity 9 partly surrounds a second region 10 of this layer 4 and into which the filled cavity 5 runs.

In the example shown, the second region 10 longitudinally extends the central branch of the first region 6 and has a transverse end surface 11, on the opposite side from the region 6, which lies a short distance from a transverse wall 12 of the cavity 9 so as to define a space 13. In addition, the surface groove 8 runs longitudinally to the second region 12 and this groove 8 is interrupted by the space 13.

As a result, the first region 6 and this second region 10 are adjacent and peripherally completely surrounded by the groove 5 and the cavity 9, so that the closed part 14 of the conducting layer 4 thus defined is electrically isolated from the rest of this layer surrounding the groove 5 and the cavity 9.

Next, as shown in FIGS. 8 and 9, the insulating layer 3 is excavated around and beneath the region 10 of the isolated part 14 of the conducting layer 4, so that the deepened cavity 9 has a recess 15 beneath the second region 10 of the isolated part 14 of the layer 4.

As a result, the region 10 of the isolated part 14 of the conducting layer 4 constitutes a cantilevered beam 16 that lies freely in the cavity 9 and is firmly set in by its region 6 surrounded by the filled groove 5 and attached from below to the insulating layer 3.

Next, as may be seen in FIGS. 10 and 11, a longitudinal optical microfiber 17 is fastened in the surface part of the groove 8 in such a way that one end of this microfiber 17 coincides with the end 11 of the beam 16 and a longitudinal optical fiber 18 is fastened in the other part of the groove 8 in such a way that one end of this microfiber 18 coincides with the wall 12 of the cavity 9.

Thus, the optical microfibers 17 and 18 are optically coupled via their ends and any bending of the beam 16, obtained by an actuating member that will be described later, allows this coupling to be modified.

Next, an electrical connection pad 19 is produced, for example in the region 6 of the isolated part 14 of the conducting layer 4 and an electrical connection pad 20 is produced at a point in the rest of this conducting layer 4, so that the abovementioned actuating member can be electrically controlled, as will be explained later.

A description will now be given, with reference to FIGS. 12 to 16, of the various steps in the fabrication of a second optical structure 200, shown in its final form in FIGS. 16 and 17.

Figure 12:
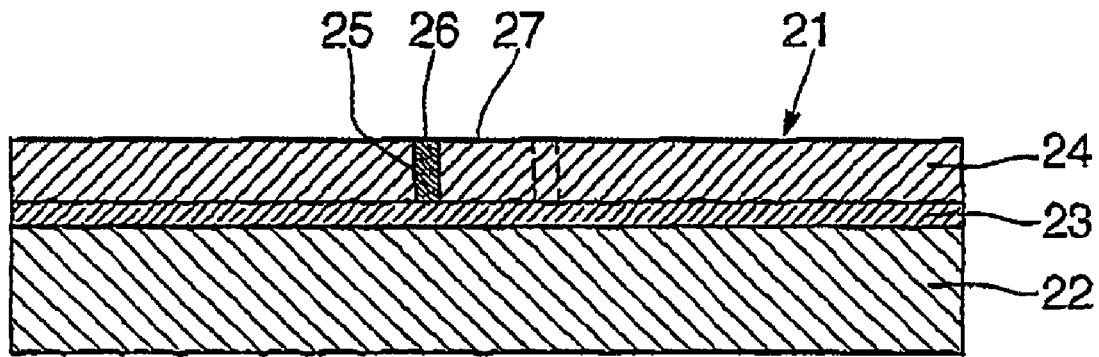
FIG. 12 shows a longitudinal section of a second base structure after a first fabrication step, which corresponds to the first base structure in FIGS. 2 and 3.

FIG. 12 in particular shows that the process starts with a base structure 21 identical to the base structure 1 of the previous example, which comprises a substrate 22 on which a first layer 23 of an insulating material is deposited, a second layer 24 of an electrically conducting material being deposited on this first layer 23.

As described with reference to FIGS. 2 and 3, a groove 25, of the same shape as the groove 5 in the previous example, is excavated in the conducting layer 25, this groove 25 being filled with an insulating material 26 and partly surrounding and defining a first region 27.

Figure 13:
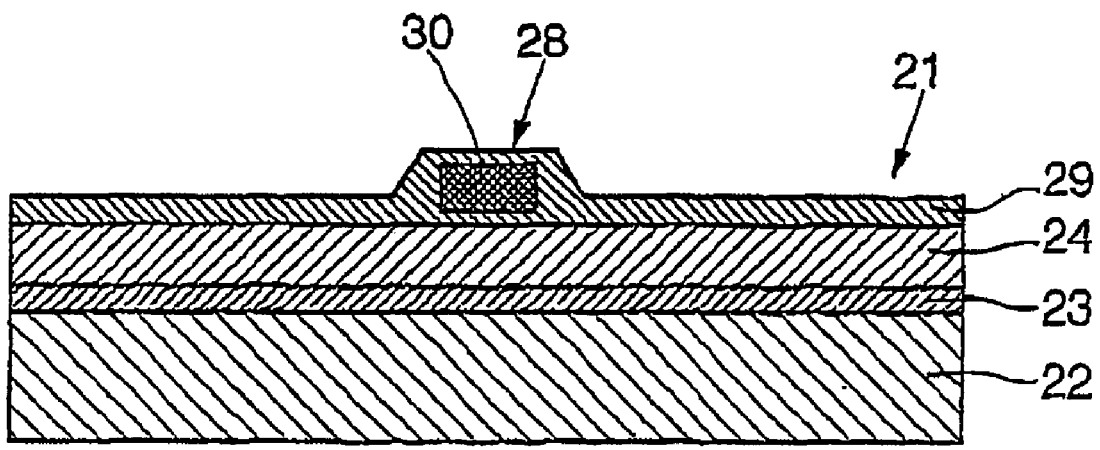
FIG. 13 shows a cross section of the second base structure after a second fabrication step.

Next, as shown in FIG. 13, an integrated longitudinal microguide 28 is produced in the conducting layer 24 by depositing a layer 29 and by producing a longitudinal optical transmission core 30, the surface layer 29 being made of an electrically insulating material, for example undoped silica, and the transmission core 29 being made of doped silica or of silicon nitride.

Like the surface groove 8 of the previous example, the transmission core 30 extends longitudinally, passing over the filled groove 25 and between the end parts 25a and 25b of this groove.

Figure 14:
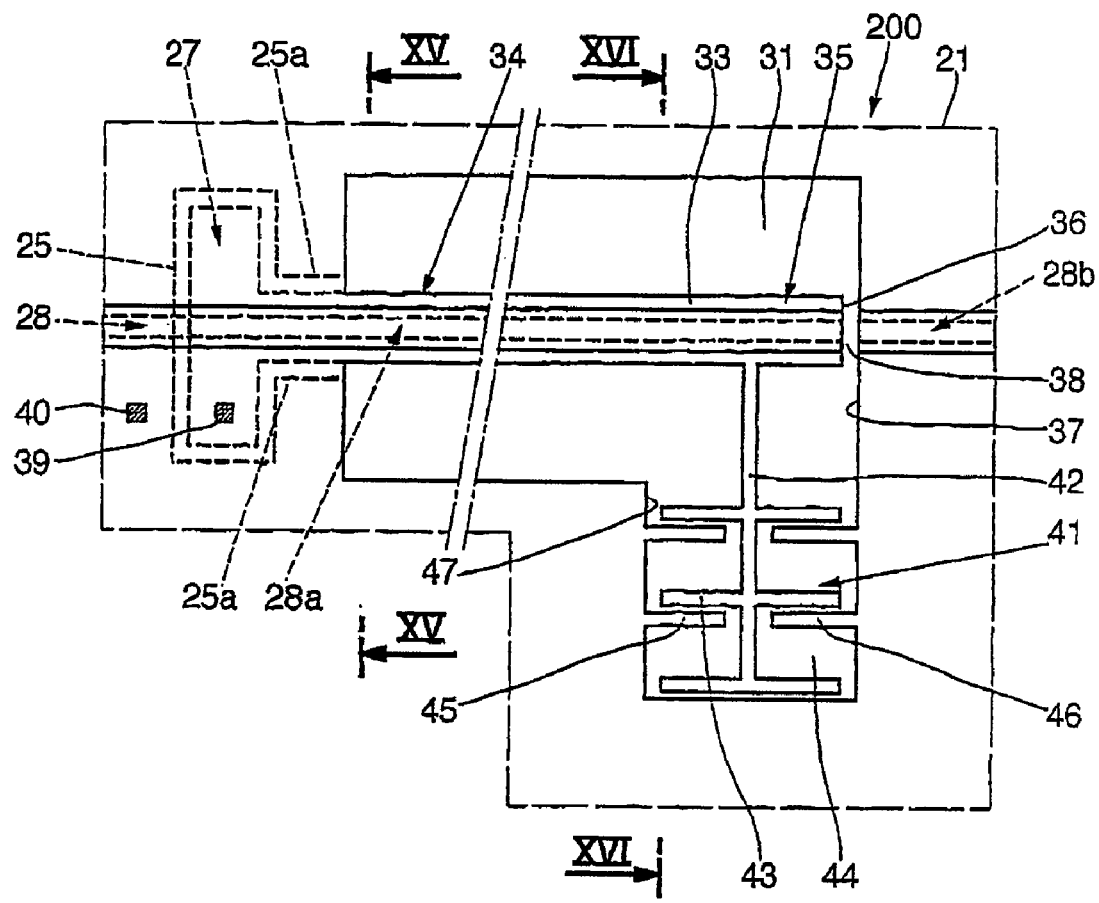
FIG. 14 shows a top view of the second base structure after a second fabrication step, which constitutes a second final optical structure according to the present invention.
Figure 15:
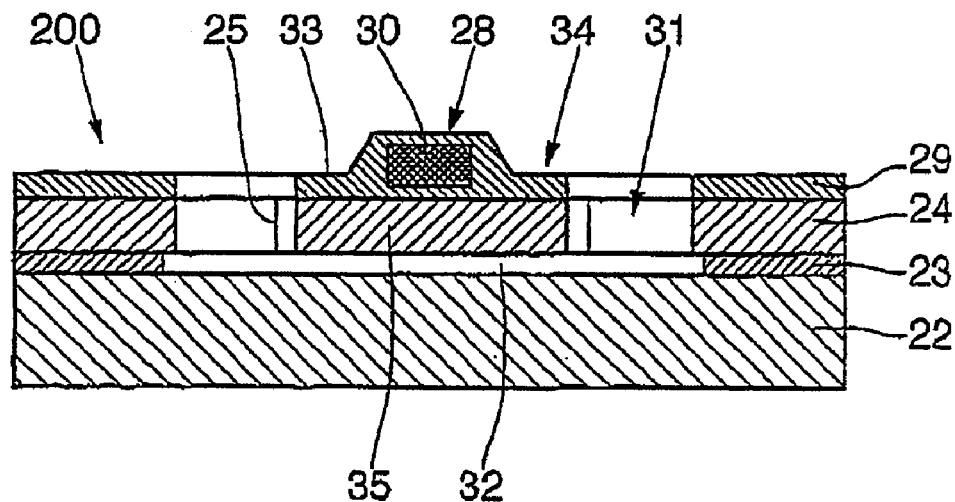
FIG. 15 shows a cross section on XV—XV of the final optical structure in FIG. 14.
Figure 16:
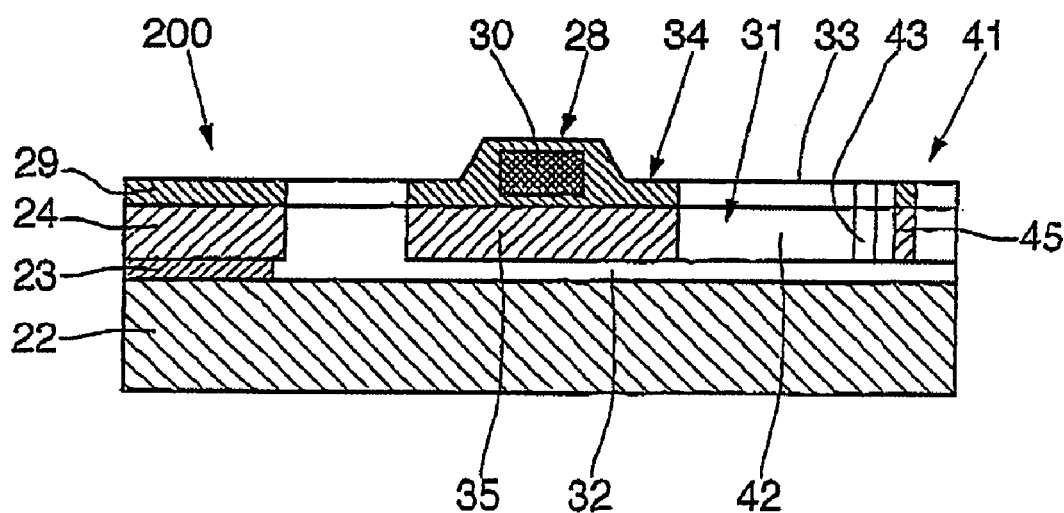
FIG. 16 shows a cross section on XVI—XVI of the final optical structure in FIG. 14.

Next, as shown in FIGS. 14 to 16, a cavity 31 is excavated in the nonconducting surface layer 29, then in the conducting layer 24 and then in the nonconducting layer 23, said cavity 31 having a recess 32 and the filled cavity 25 running into this cavity 31.

As in the previous example, the cavity 31 defines and partly surrounds a second region 33 adjacent the first region 27, in such a way that the conducting layer 24 has an isolated part 34, the periphery of which is surrounded by the groove 25 and the cavity 31, the region 27 and the groove 25 being this time covered with the surface layer 29.

As in the previous example, a longitudinal cantilevered beam 35 is thus produced in the cavity 31, in the second region 33 and in the extension of the first region 27, the transverse end surface 36 of this beam 35 being separated from a transverse wall 37 of the cavity 31 by a space 38.

The optical microguide 28, being cut by the space 38, has a part 28a, the transmission core of which extends along the beam 35 as far as its end 36, and a part 28b, the transmission core of which extends as far as the transverse wall 37 of the cavity 31, these parts 28a and 28b being optically coupled via the space 38.

Next, holes are excavated in the surface layer 29 as far as the conducting layer 24, these being filled with electrically conducting material so as to constitute, on the one hand, an electrical connection pad 39 in the region 27 of the part 34 of the layer 24 and, on the other hand, an electrical connection pad 34 in the other part of this layer, these pads 39 and 40 being intended to establish a potential difference between these isolated parts of the conducting layer 24.

Complementarily, the cavity 31 and the recess 32 are excavated so as furthermore to constitute, by the same operations, a member 41 for actuating the beam 35.

This actuating member 41 comprises, in the cavity 31, a transverse arm 42 integral with the beam 34, at a point close to its end 36, which arm lies parallel to the wall 37 of the cavity 31 and has, laterally, opposed branches 43 and 44.

The actuating member 41 also includes opposed branches 44 and 46 which project into the cavity 31 from the transverse wall 37 and from an opposed transverse wall 47 of the cavity 31, these branches 45 and 46 extending between, on the one hand, the branches 43, and on the other hand, the branches 44.

Like the beam 35, the side arm 42 and the branches 43, 44, 45 and 46 are made of the material of the layers 24 and 29. Thus, the side arm 42 and the branches 43 and 44 form part of the electrically isolated second region 33 and are electrically connected to the pad 39 via the beam 35, whereas the branches 45 and 46 are electrically connected to the electrical connection pad 40.

Preferably, the opposing faces of the branches 43 and 45, on the one hand, and of the branches 44 and 46, on the other hand, are subsequently covered with metal layers (not shown) in such a way that these branches constitute electrodes.

It follows from the foregoing that the existence of the groove 25 filled with insulation and the embodiment of the cavity 31 allow electrical isolation of the beam 35 and those parts of the actuating member 41 formed by the side arm 42 and the branches 43 and 44, in such a way that it is simple to supply this actuating member 41 with electrical energy.

This is because all that is required is for the pads 39 and 40 to be electrically connected, in particular by electrical connection wires, to a control device (not shown) so as to activate the actuating member 41 in order to make the beam 35 bend as required and to thus modify the optical coupling between the two parts 28a and 28b of the optical microguide 28.

Of course, the actuating member 41 as has just been described may be produced in the optical structure 100 described with reference to FIGS. 1 to 11 during the operation of the cavity 9.

In a specific embodiment of the optical structure 200, the thickness of the conducting layer 24 could be about 60 microns and the width of the optical microguide core 28 could be about 8 microns. Under these conditions, the width and the length of the branches of the first region could be about 50 microns and the width of the groove could be about 5 microns, the cavity 31 being wide enough to allow the beam 35 to bend and for the operation of the actuating member 41 not to be electrically disturbed. Such dimensions are also applicable to the optical structure 100.

According to a variant of the invention, the groove 5 filled with material 7 could be replaced with a doping of the layer 4 so as to create an integrated wall of electrical insulation.

In general, the operations for producing the grooves, the cavities and the holes, together with the operations for producing the optical microguides, may be carried out by photolithographic, etching, deposition and chemical-mechanical planarization processes known in microelectronics.

The present invention is not limited to the examples described above. The optical structures could have cavities and filled grooves suitable for forming beams of any desired shape, particularly platforms supported by electrically isolated arms that can move in translation. The optical structures could have a multiplicity of optical microfibers or of integrated microguides. The actuating members could have different arrangements. The shape of the grooves filled with insulation could have different shapes. Many variants are in fact possible without departing from the scope defined by the appended claims.

What is claimed is:

1. A process for producing a structure provided with at least one optical guiding means for the purpose of transmitting at least one optical or light wave, characterized in that it consists:
   in providing a substrate with an electrically nonconducting first layer (3) and with an electrically conducting second layer (4);
   in producing a wall (5) of electrical insulation in the second layer (4) at least up to the first layer, having two opposed ends (5a, 5b) and partly surrounding a first region (6) of the second layer; and
   in excavating a cavity (9) in the second layer and then in said first layer, partly surrounding a second region (10) of the second layer (4), adjacent or extending said first region (6) and into which said wall (5) emerges, this cavity including a recess (15) in the second layer beneath at least part of the second region;
   in such a way that the closed part (14) of the second layer (4) corresponding to said regions (6, 10) is electrically isolated from the rest of the second layer and in such a way that the part of the recess (15) exposed from underneath said second region (10) constitutes a beam (16).

2. The process as claimed in claim 1, characterized in that it consists, for the purpose of producing said wall of insulation: in excavating a groove (5) in the second layer (4) at least as far as the first layer, having two opposed ends (5a, 5b) and partly surrounding a first region (6) of this layer; and in at least partly filling said groove with an electrically insulating material (7) to form a fill groove, said groove (5) running into said cavity (9).

3. The process as claimed in claim 1, characterized in that it consists in producing a recess (15) such that said beam (16) is cantilevered.

4. The process as claimed in claim 2, characterized in that it consists in producing at least one optical guiding means (28) which passes over said wall of insulation or said filled groove (5) and between said ends (5a, 5b) of this filled groove.

5. The process as claimed in claim 2, characterized in that it consists, between the operation of producing said wall of insulation or of filling said groove and the operation of producing said cavity, in producing at least one optical microguide (28) on the second layer, which passes over said wall of insulation or said filled groove (5) and which passes between said ends (5a, 5b) of this wall of insulation or of this groove.

6. The process as claimed in claim 2, characterized in that it consists, between the operation of producing said wall of insulation or of filling said groove and the operation of producing said cavity, in producing at least one surface groove (8) in said second layer (4), which passes over said wall of insulation or said filled groove (5) and between said ends (5a, 5b) of this wall of insulation or this filled groove and, after the operation of producing said cavity and of said recess, in fastening an optical microfiber (17, 18) along this surface groove.

7. The process as claimed in claim 6, characterized in that it consists in producing at least one surface groove (8) that passes over the cavity (6) to be produced.

8. The process as claimed in claim 1, characterized in that it consists in producing a wall of insulation or a groove (5) that has end parts (5a, 5b) close together.

9. The process as claimed in claim 1, characterized in that it consists in producing a wall of insulation or a groove (5) that defines a T-shaped first region (6) having a central branch directed toward said second region (10) and two opposed side branches.

10. The process as claimed in claim 1, characterized in that it consists in producing an electrical connection pad (19) in said first region (6).

11. The process as claimed in claim 1, characterized in that it consists in producing said wall of insulation by locally doping said second layer (10).

12. An optical structure provided with at least one optical guiding means for the purpose of transmitting at least one optical or light wave, characterized in that it comprises in succession, on a substrate, an electrically nonconducting first layer (3), an electrically conducting second layer (4), and optical guiding means; in that the second layer comprises a closed part (14), the periphery of which is bounded by a groove (5) and a cavity (9) which are excavated at least as far as the first layer so as to electrically isolate the closed part from the rest of the second layer, said groove being at least partly filled with an electrically insulating material (7) and said cavity extending into said first layer, leaving a recess (15) beneath said second layer so that the second layer constitutes a beam above this recess; and in that it includes at least one optical guiding means (16, 28) extending along said second layer (4) and passing over said filled groove (5) and between the ends of this groove (5a, 5b).

13. An optical structure provided with at least one optical guiding means for the purpose of transmitting at least one optical or light wave, characterized in that it comprises in succession, on a substrate, an electrically nonconducting first layer (3), an electrically conducting second layer (4), and optical guiding means; in that the second layer comprises a closed part (14), the periphery of which is bounded by a wall of electrical insulation (5) and a cavity (9) which are excavated at least as far as the first layer so as to electrically isolate the closed part from the rest of the second layer, said cavity extending into said first layer, leaving a recess (15) beneath said second layer so that the second layer constitutes a beam above this recess; and in that it includes at least one optical guiding means (16, 28) extending along said second layer (4) and passing over said wall of insulation (5) and between the ends of said wall of insulation (5a, 5b).

14. The structure as claimed in claim 12, characterized in that said groove (5) defines a T-shaped or C-shaped first region (6), which has a central branch directed toward a second region and two opposed side branches.

15. The structure as claimed in claim 12, characterized in that said recess (15) is extended so as to constitute a cantilevered beam (16).

16. The structure as claimed in claim 12, characterized in that said optical guiding means include an integrated optical microguide (28).

17. The structure as claimed in claim 12, characterized in that said optical guiding means include another surface groove (8) made in said second layer (4) and at least one optical microfiber (17) installed along said surface groove.

18. The structure as claimed in claim 12, characterized in that said optical guiding means extends as far as the edge of said cavity (9).

19. The structure as claimed in claim 14, characterized in that it includes an electrical connection pad (19) formed in said first region (6).

20. The structure as claimed in claim 12, characterized in that it includes an actuating member (41), said beam (35) comprising at least part of this actuating member.

* * * * *